United States Patent
Rajagopalan et al.

(10) Patent No.: US 9,801,094 B2
(45) Date of Patent: *Oct. 24, 2017

(54) DISTRIBUTED LOAD MANAGEMENT ON NETWORK DEVICES

(71) Applicant: CISCO TECHNOLOGY, INC., San Jose, CA (US)

(72) Inventors: Ramakumar Rajagopalan, Chennai (IN); Hassan Khani Sidhiq, Bangalore (IN); Mohan Rangan, Nashua, NH (US); Aditya Prakash, Distt. Hathras (IN); Lakshman Kumar Narayanan, Coimbatore (IN); Sridhar Bhaskaran, Coimbatore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/070,935

(22) Filed: Mar. 15, 2016

(65) Prior Publication Data
US 2016/0198365 A1 Jul. 7, 2016

Related U.S. Application Data

(63) Continuation of application No. 13/912,867, filed on Jun. 7, 2013, now Pat. No. 9,294,981, which is a (Continued)

(51) Int. Cl.
*H04W 28/08* (2009.01)
*H04W 28/10* (2009.01)
(Continued)

(52) U.S. Cl.
CPC ....... *H04W 28/08* (2013.01); *H04W 28/0289* (2013.01); *H04W 28/10* (2013.01); *H04W 36/22* (2013.01); *H04W 28/02* (2013.01)

(58) Field of Classification Search
CPC ..... H04W 36/22; H04W 28/10; H04W 28/08; H04W 28/0289; H04W 28/02
See application file for complete search history.

(56) References Cited

U.S. PATENT DOCUMENTS

| 5,898,713 A | 4/1999 | Melzer et al. |
| 6,535,732 B1 | 3/2003 | Mcintosh et al. |

(Continued)

FOREIGN PATENT DOCUMENTS

| EP | 1250022 A1 | 10/2002 |
| EP | 1619917 A1 | 1/2006 |

(Continued)

OTHER PUBLICATIONS

3GPP TR 25.820 v8.0.0 (Mar. 2008), 3rd Generation Partnership Project; Technical Specification Group Radio Access Networks; 3G Home NobeB Study Item Technical Report |(Release 8); Mar. 2008 (37 pages).

(Continued)

*Primary Examiner* — Brian D Nguyen
(74) *Attorney, Agent, or Firm* — Patterson + Sheridan, LLP

(57) ABSTRACT

This disclosure relates to a system and method for dynamically managing load on network devices in a distributed manner. As the proliferation of data rich content and increasingly more capable mobile devices has continued, the amount of data communicated over mobile operator's networks has exponentially increased. Upgrading the existing network to accommodate increased data traffic is neither desirable nor practical. One way to accommodate increased data traffic is by utilizing network resources more efficiently. This disclosure provides systems and methods for efficiently (Continued)

utilizing network resources by dynamically configuring the network in a distributed manner based on real-time load information.

20 Claims, 9 Drawing Sheets

Related U.S. Application Data continuation of application No. 12/984,335, filed on Jan. 4, 2011, now Pat. No. 8,477,730.

(51) Int. Cl.
*H04W 28/02* (2009.01)
*H04W 36/22* (2009.01)

(56) References Cited

U.S. PATENT DOCUMENTS

| | | | |
|---|---|---|---|
| 6,643,621 B1 | 11/2003 | Dodrill et al. | |
| 6,917,592 B1 | 7/2005 | Ramankutty et al. | |
| 7,792,113 B1 | 9/2010 | Foschiano et al. | |
| 7,808,919 B2 | 10/2010 | Nadeau et al. | |
| 7,827,256 B2 | 11/2010 | Phillips et al. | |
| 7,856,512 B2 | 12/2010 | Hilla et al. | |
| 7,885,248 B2 | 2/2011 | Harper et al. | |
| 7,885,260 B2 | 2/2011 | Paul et al. | |
| 7,890,636 B2 | 2/2011 | Grayson et al. | |
| 8,103,310 B1 | 1/2012 | Srinivas et al. | |
| 8,477,730 B2 | 7/2013 | Rajagopalan et al. | |
| 8,787,331 B2 | 7/2014 | Liu et al. | |
| 9,294,981 B2 | 3/2016 | Rajagopalan et al. | |
| 2003/0028644 A1* | 2/2003 | Maguire | H04W 28/08 709/226 |
| 2004/0102199 A1* | 5/2004 | Haumont | H04W 68/12 455/458 |
| 2004/0224678 A1 | 11/2004 | Dahod et al. | |
| 2005/0091371 A1 | 4/2005 | DeLeQue et al. | |
| 2005/0239473 A1 | 10/2005 | Pan et al. | |
| 2006/0018328 A1 | 1/2006 | Mody et al. | |
| 2006/0234678 A1 | 10/2006 | Juitt et al. | |
| 2006/0291388 A1 | 12/2006 | Amdahl et al. | |
| 2007/0091877 A1* | 4/2007 | Lundin | H04L 45/00 370/353 |
| 2007/0097983 A1 | 5/2007 | Nylander et al. | |
| 2007/0105568 A1 | 5/2007 | Nylander et al. | |
| 2007/0116019 A1 | 5/2007 | Cheever et al. | |
| 2007/0116020 A1 | 5/2007 | Cheever et al. | |
| 2007/0243872 A1 | 10/2007 | Gallagher et al. | |
| 2007/0253328 A1 | 11/2007 | Harper et al. | |
| 2008/0137541 A1 | 6/2008 | Agarwal et al. | |
| 2008/0162637 A1 | 7/2008 | Adamczyk et al. | |
| 2008/0188223 A1 | 8/2008 | Vesterinen et al. | |
| 2008/0220783 A1 | 9/2008 | Lautier et al. | |
| 2008/0316980 A1* | 12/2008 | Ahlen | H04W 64/00 370/338 |
| 2009/0061821 A1 | 3/2009 | Chen et al. | |
| 2009/0061873 A1 | 3/2009 | Bao et al. | |
| 2009/0067417 A1 | 3/2009 | Kalavade et al. | |
| 2009/0070176 A1 | 3/2009 | Altice et al. | |
| 2009/0086742 A1 | 4/2009 | Ghai et al. | |
| 2009/0089447 A1 | 4/2009 | Balachandran et al. | |
| 2009/0098872 A1 | 4/2009 | Deshpande et al. | |
| 2009/0129271 A1 | 5/2009 | Ramankutty et al. | |
| 2009/0156213 A1 | 6/2009 | Spinelli et al. | |
| 2009/0168675 A1 | 7/2009 | Tao | |
| 2009/0207759 A1 | 8/2009 | Andreasen et al. | |
| 2009/0215438 A1 | 8/2009 | Mittal et al. | |
| 2009/0262682 A1 | 10/2009 | Khetawat et al. | |
| 2009/0285183 A1* | 11/2009 | Wu | H04L 12/5695 370/331 |
| 2009/0286510 A1 | 11/2009 | Huber et al. | |
| 2010/0035609 A1* | 2/2010 | Hui | H04W 8/06 455/433 |
| 2010/0077102 A1 | 3/2010 | Lim et al. | |
| 2010/0091653 A1 | 4/2010 | Koodli et al. | |
| 2010/0120399 A1 | 5/2010 | Guo et al. | |
| 2010/0124933 A1 | 5/2010 | Chowdury et al. | |
| 2010/0195640 A1 | 8/2010 | Park et al. | |
| 2010/0272031 A1 | 10/2010 | Grayson et al. | |
| 2010/0291897 A1 | 11/2010 | Ghai | |
| 2011/0021192 A1 | 1/2011 | Grayson et al. | |
| 2011/0021196 A1 | 1/2011 | Grayson et al. | |
| 2011/0058479 A1 | 3/2011 | Chowdhury | |
| 2011/0075557 A1 | 3/2011 | Chowdhury et al. | |
| 2011/0075675 A1 | 3/2011 | Koodli et al. | |
| 2011/0116470 A1 | 5/2011 | Arora et al. | |
| 2012/0039313 A1* | 2/2012 | Jain | H04B 17/318 370/338 |
| 2012/0113894 A1* | 5/2012 | Yang | H04W 60/04 370/328 |
| 2012/0135719 A1 | 5/2012 | Haughn | |

FOREIGN PATENT DOCUMENTS

EP 1978685 A1 10/2008
WO WO/20090089455 7/2009

OTHER PUBLICATIONS

3GPP TR 29.814 v7.1.0 (Jun. 2007), 3rd Generation Partnership Project; Technical Specification Group Core Networks and Terminals Feasibility Study on Bandwidth Savings at Nb Interface with IP transport (Release 7), Global System for Mobile Communications, Jun. 2007 (19 pages).

3GPP TS 22.011 v8.4.0 (Jun. 2008), 3rd Generation Partnership Project; Technical Specification Group Services and System Aspects; Service accessibility (Release 8), Global System for Mobile Communications, Jun. 2008 (25 pages).

3GPP TS 22.220 v0.3.0 (Jul. 2008), 3rd Generation Partnership Project; Technical Specification Group Services and System Aspects; Service requirements for Home NodeBs and Home eNodeBs; (Release 9), Jul. 2008. (13 pages).

3GPP TS 23.041 v7.0.0 (Mar. 2006), 3rd Generation Partnership Project; Technical Specification Group Terminals; Technical realization of Cell Broadcast Service (CBS) (Release 7), Global System for Mobile Communications, Mar. 2006. (36 pages).

3GPP TS 23.060 v8.1.0 (Jun. 2008), 3rd Generation Partnership Project; Technical Specification Group Services and System Aspects; General Packet Radio Service (GPRS); Service description; Stage 2 (Release 8), Global System for Mobile Communications, Jun. 2008 (259 pages).

3GPP TS 23.107 v7.1.0 (Sep. 2007), 3rd Generation Partnership Project; Technical Specification Group Services and System Aspects; Quality of Service (QoS) concept and architecture (Release 7), Sep. 2007 (40 pages).

3GPP TS 23.153 v7.2.0 (Mar. 2007), 3rd Generation Partnership Project; Technical Specification Group Core Network and Terminals; Out of band transcoder control; Stage 2 |(Release 7); Global System for Mobile Communications, Mar. 2007 (77 pages).

3GPP TS 23.228 v8.5.0 (Jun. 2008), 3rd Generation Partnership Project; Technical Specification Group Services and System Aspects; IP Multimedia Subsystem (IMS); Stage 2 |(Release 8), Jun. 2008 (240 pages).

3GPP TS 23.234 v7.7.0 (Jun. 2008), 3rd Generation Partnership Project; Technical Specification Group Services and System Aspects; 3GPP system to Wireless Local Area Network (WLAN) interworking; System description (Release 7), Jun. 2008 (85 pages).

3GPP TS 23.236 v. 10 Technical Specification "3rd Generation Partnership Project; Technical Specification Group Services and Systems Aspects; Intra/Domain Connection of Radio Access Network (RAN) Nodes to Multiple Core Network (CN) Nodes (Release 10)." Mar. 2010 (39 pages).

3GPP TS 23.236 v7.0.0 (Dec. 2006), 3rd Generation Partnership Project; Technical Specification Group Services and System Aspects; Intra/domain connection of Radio Access Network (RAN)

(56) References Cited

OTHER PUBLICATIONS nodes to multiple Core Network (CN) nodes (Release 7); Global System for Mobile Communications, http://www.3gpp.org, 2006 (37 pages).

3GPP TS 23.251 v7.0.0 (Jun. 2007), 3rd Generation Partnership Project; Technical Specification Group Services and System Aspects; Network Sharing; Architecture and functional description (Release 7), Global System for Mobile Communications, http://www.3gpp.org, 2007 (18 pages).

3GPP TS 24.234 v7.5.0 (Mar. 2007), 3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 7), Global System for Mobile Communications, http://www.3gpp.org, 2007; 32 pages).

3GPP TS 25.412 v7.1.0 (Jun. 2006), 3rd Generation Partnership Project; Technical Specification Group Radio Access Network; UTRAN lu interface signaling transport (Release 7), http://www.3gpp.org, 2006 (11 pages).

3GPP TS 25.410 v7.0.0 (Mar. 2006), 3rd Generation Partnership Project; Technical Specification Group Radio Access Network; UTRAN lu Interface: general aspects and principles (Release 7), http://www.3gpp.org, 2006 (28 pages).

3GPP TS 25.411 v7.1.0 (Sep. 2007); 3rd Generation Partnership Project; Technical Specification Group Radio Access Network; UTRAL lu interface layer 1 (Release 7), http://www.3gpp.org, 2007 (9 pages).

3GPP TS 25.413 V7.8.0 (Dec. 2007), 3rd Generation Partnership Project; Technical Specification Group Radio Access Network; UTRAN lu interface RANAP signaling (Release 7), http://www.3gpp.org, 2007 (359 pages).

3GPP TS 25.414 v7.1.0 (Sep. 2006), 3rd Generation Partnership Project; Technical Specification Group Radio Access Network; UTRAN lu interface transport and transport signaling (Release 7), http://www.3gpp.org, 2006 (20 pages).

3GPP TS 25.415 v7.3.0 (Dec. 2006), 3rd Generation Partnership Project; Technical Specification Group Radio Access Network; UTRAN lu interface user plane protocols (Release 7), http://www.3gpp.org, 2006 (64 pages).

3GPP TS 25.419 v7.0.0 (Mar. 2006), 3rd Generation Partnership Project; Technical Specification Group RAN; UTRAN lu/BC Interface: Service Area Broadcast Protocol (SABP) | (Release 7), http://www.3gpp.org, 2006 (77 pages).

3GPP TS 29.163 v8.3.0 (May 2008), 3rd Generation Partnership Project; Technical Specification Group Core Network and Terminals; Interworking between the IP Multimedia (IM) Core Network (CN) subsystem and Circuit Switched (CS) networks (Release 8), Global System for Mobile Communications, http://www.3gpp.org, 2008 (237 pages).

3GPP TS 29.232 v8.3.0 (Jun. 2008), 3rd Generation Partnership Project; Technical Specification Group Core Network and Terminals; Media Gateway Controller (MGC)/ Media Gateway (MGW) interface; Stage 3 (Release 8), http://www.3gpp.org, 2008 (145 pages).

3GPP TS 29.234 v7.9.0 (Jun. 2008), 3rd Generation Partnership Project; Technical Specification Group Core Network and Terminals; 3GPP system to Wireless Local Area Network (WLAN) interworking; Stage 3 (Release 7); http://www.3gpp.org, 2008 (92 pages).

3GPP TS 29.332 v8.2.0 (Jun. 2008), 3rd Generation Partnership Project; Technical Specification Group Core Network and Terminals; Media Gateway Control Function (MGCF)/ IM Media Gateway; Mn Interface (Release 8), http://www.3gpp.org, 2008 (73 pages).

\* cited by examiner

DISTRIBUTED LOAD MANAGEMENT ON NETWORK DEVICES

RELATED APPLICATIONS

This Application is a continuation (and claims the benefit of priority under 35 U.S.C. §120) of U.S. application Ser. No. 13/912,867, filed Jun. 7, 2013, entitled "DISTRIBUTED LOAD MANAGEMENT ON NETWORK DEVICES," Inventors Ramakumar Rajagopalan, et al., (now issued as U.S. Pat. No. 9,294,981) which is a continuation (and claims the benefit of priority under 35 U.S.C. §120) of U.S. application Ser. No. 12/984,335, filed Jan. 4, 2011, entitled "DISTRIBUTED LOAD MANAGEMENT ON NETWORK DEVICES" (now issued as U.S. Pat. No. 8,477,730). The disclosures of the prior applications are considered part of (and are incorporated by reference in) the disclosure of this application.

FIELD OF THE DISCLOSURE

This disclosure relates generally to a system and method for dynamically managing load on network devices in a distributed manner.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) as long as the user is within range of such a wireless communication technology. The range of the wireless communication technology can vary depending on the deployment. A macro cell transceiver is typically used by service providers to provide coverage over about a five kilometer distance. A pico cell transceiver can provide coverage over about a half kilometer distance, and a femto cell transceiver can provide coverage over a 50-200 meter distance. A femto cell transceiver is similar in coverage to a WiFi (WLAN) access point and can be used to provide network access over a short range.

DESCRIPTION OF EXAMPLE EMBODIMENTS

Overview

Figure 1:
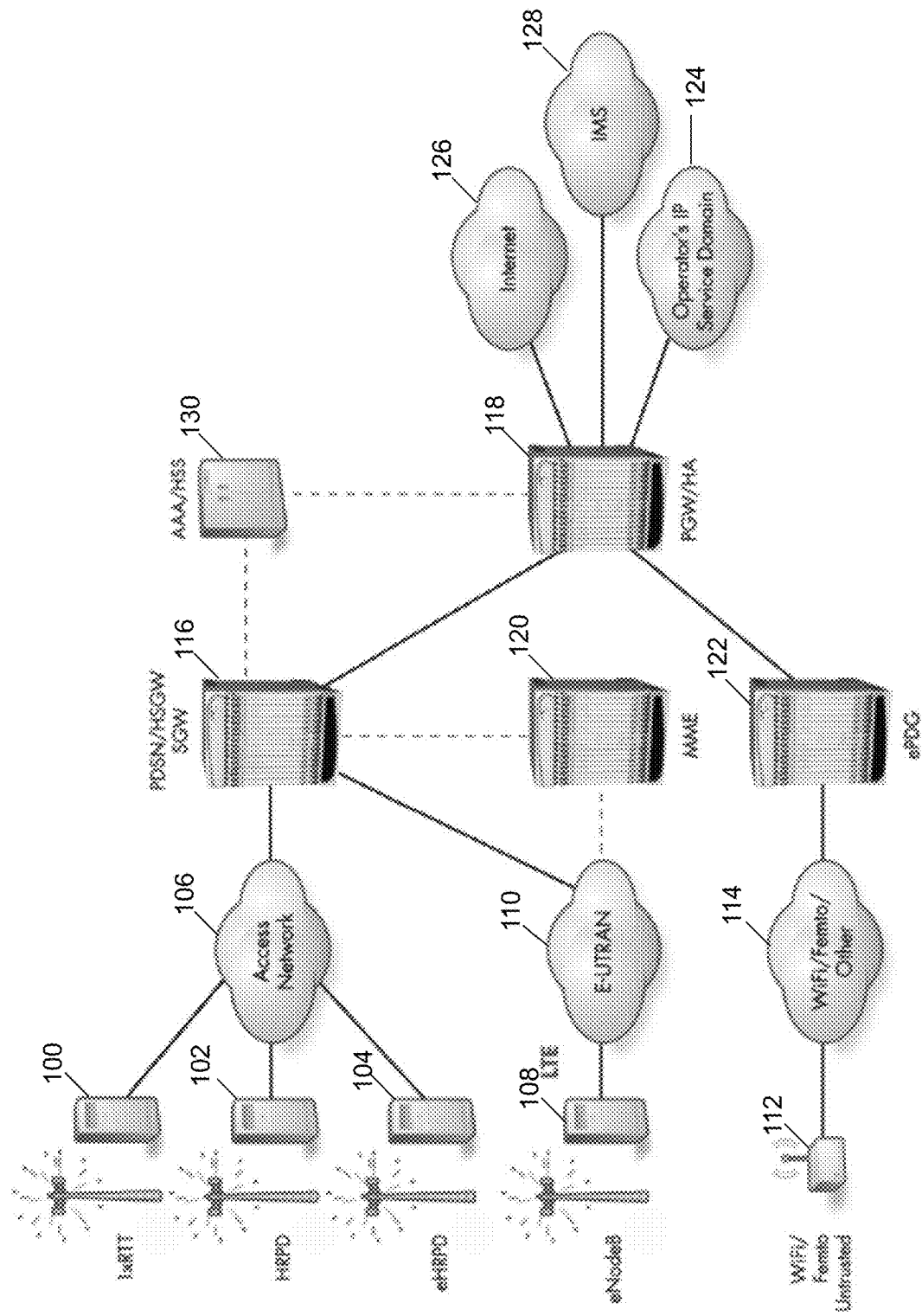
FIGS. 1-2 illustrate communication networks including a long term evolution (LTE) topology in accordance with some embodiments.

Certain embodiments disclose a system comprising a first network device in communication with at least one second network device over a communication channel, the first network device sending a message from the first network device to the second network device through the communication channel to request load information, and in response to receiving the load information from the second network device, the first network device determining the amount of load to be handed over to the second network device, and the first network device sending a message from the first network device to the second network device to request setting aside data transfer capacity for the first network device, and in response to receiving a confirmation from the second network device that the data transfer capacity has been set aside for the first network device, the first network device selecting mobile stations to be handed over to the second network device, and the first network device re-routing the selected mobile stations to the second network device by modifying a serving network device identifier in a mobile station identifier.

Example Embodiments

The increase in mobile data traffic is straining operators' existing packet core elements. The increase in data traffic can overload network devices, and it may even cause service disruptions that may necessitate manual interventions by operators. Unfortunately, the demand for mobile data is not expected to slow, especially as mobile devices become more sophisticated and as users become more dependent on mobile devices. In order to provide high quality services amid a rapid increase in data traffic, operators often invest heavily on improving the telecommunication infrastructure by, for instance, installing more network devices. However, the heavy investment in infrastructure can rapidly increase the data delivery cost, and it can also challenge the prevalent flat-rate data service models. Furthermore, even the improved infrastructure cannot entirely eliminate service disruptions. If the improved infrastructure is inefficiently managed, many critical issues with large data volume will remain. Therefore, an efficient operation of network is important for delivering quality services. This disclosure describes systems and methods for efficiently utilizing network resources by dynamically configuring the network in a distributed manner based on real-time load information.

At a high level, the goal of dynamic load management is to fully utilize network resources using the real-time network usage information, i.e., real-time load information. Dynamic load management can be beneficial on at least two fronts: network device overload prevention and data traffic offloading. An overloaded network device cannot accept new attach requests from mobile stations, nor can it provide high quality services to already attached mobile stations. This can lead to customer dissatisfaction as well as potential revenue losses for operators. Network device overloading often occurs when the volume of data traffic increases. For instance, if a large number of users commute to the city center during rush hour, network devices near the city center can become prone to overloading due to the increased amount of data traffic. In order to address such worst-case data traffic, operators often choose to increase the network capacity by installing more network devices, even though network devices in suburbs are severely under-utilized. Such a decision increases data delivery cost, which in turn reduces revenue for operators. Operators could have prevented overloading simply by dynamically reconfiguring the network based on the real-time load information such as the amount of load being handled by each network device. For instance, operators could have monitored the amount of load being handled by each network device and re-routed excessive data traffic from over-utilized network devices to under-utilized network devices.

Dynamic load management can also address data traffic offloading. Sometimes, network devices are taken out-of-service for scheduled maintenance or other activities. Before network devices are taken out-of-service, they need to offload or hand over all attached sessions to other operating network devices. There are offloading standards, including Iu flex and Gb flex, that specify offloading procedures. However, these standards do not exploit real-time load information of each network device. Therefore, after offloading, the data load among operating network devices can become unbalanced. The unbalanced data load can strain the network resources and can eventually overload other network devices. The newly overloaded network devices will have to offload their data traffic to other network devices, which can further reduce the number of operating network devices and induce even more severe unbalance in the load distribution. Such a cascade effect may even lead to a network breakdown. Furthermore, existing offloading procedures can cause service disruptions to active users, leading to customer dissatisfaction. Dynamic data load management can address these issues by monitoring real-time load in each network device in the network and offloading data traffic to under-utilized network devices.

Although dynamic load management can be beneficial, implementing it in a complex network can be challenging. Operators could introduce a centralized unit that gathers load information of all network devices and distributes load to network devices. However, introducing a new control unit in an already-complex network may require an extensive network restructuring, which can be costly and undesirable. Furthermore, operation of the entire network becomes dependent on the centralized control unit. If the centralized control unit fails, the entire network can fail. A distributed solution described in this disclosure circumvents these issues. In fact, an embodiment of the disclosed invention is capable of operating on an existing network with minimal restructuring, if at all.

FIG. 1 illustrates a communication network that includes a distributed dynamic load management mechanism in accordance with certain embodiments. FIG. 1 includes a number of radio access technologies such as a 1×RTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as WiFi, Femto, WiMAX, or any other radio spectrum technology can use transceiver 112 to connect to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1×RTT 100, the HSGW functionality can be used with HRPD 102 and eHRPD 104, and the SGW functionality can be used with the eNodeB 108. The access gateway 116 can communicate with an anchor gateway 118, which can implement a packet data network gateway (PGW) and a Home Agent (HA) and a mobility management entity (MME) 120. On the access network side, the anchor gateway 118 can also communicate with an evolved packet data gateway (ePDG) 122 which provides connectivity to the WiFi/Femto/other transceiver 112. On the packet core side, the anchor gateway can communicate with the operator's IP service domain 124, the internet 126, and IP multimedia subsystem (IMS) 128. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communications network includes the MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1x and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Network Access Server (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG 122 is responsible for interworking between the EPC and fixed non-3GPP access technologies such as a WiFi, WiMAX, LTE metro, and femtocell access networks. The ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
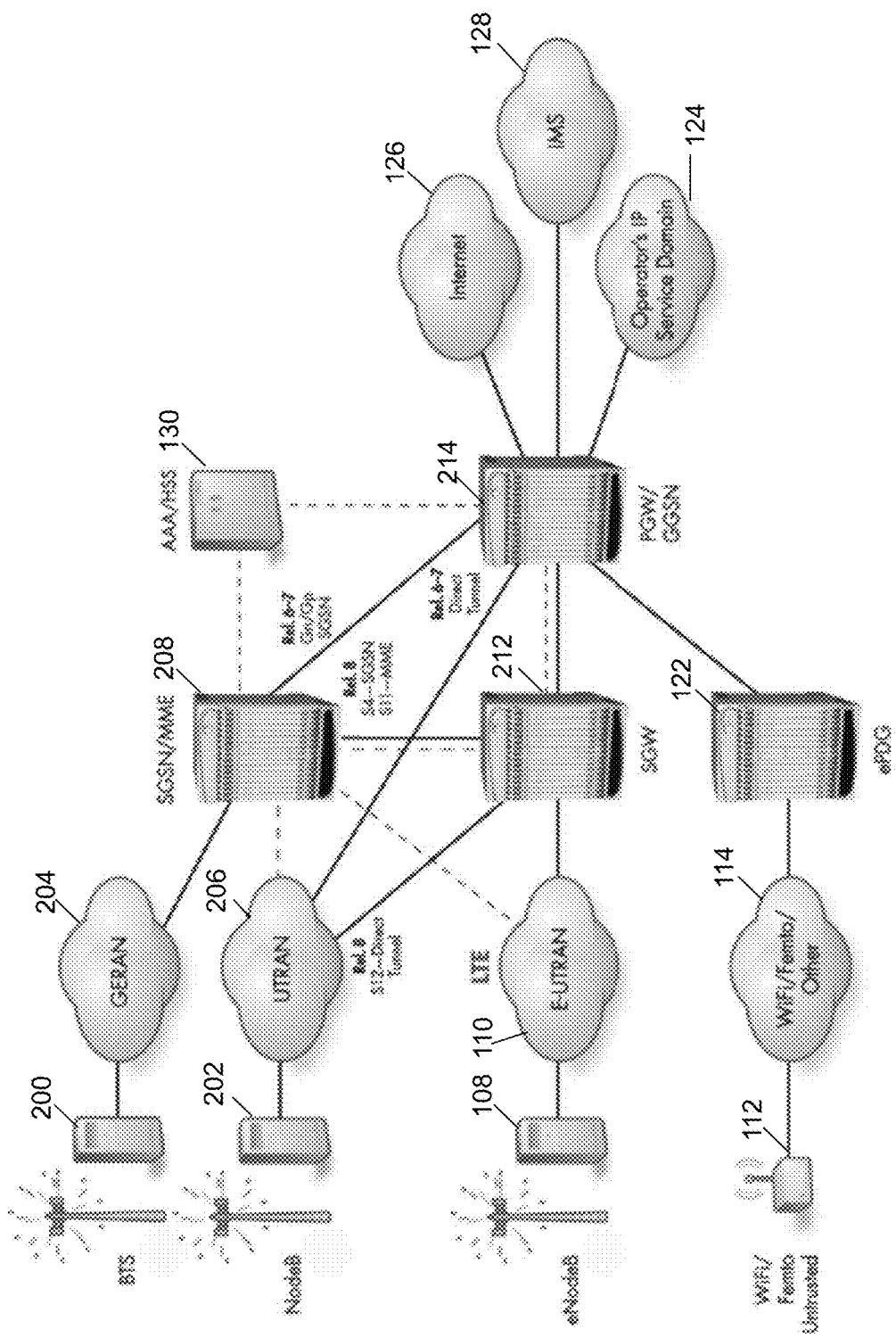

FIG. 2 illustrates a communication network that implements a dynamic load management mechanism with legacy universal mobile telecommunications systems (UMTS) network devices in accordance with certain embodiments. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214.

In some embodiments, the distributed dynamic load management scheme can be implemented on access gateways that provide network access to mobile stations, such as SGSN/MME 208, PGW/GGSN 214, and IMS 128. The access gateway can access and maintain information relating to the communication session, the subscriber, the radio bearers, and the policies relating to the communication session. The access gateway may be used to provide various services to a mobile device and implement the quality of service (QoS) on packet flows. Several of these functions are used in providing, for example, voice over IP (VoIP) routing and enhanced services, such as enhanced charging, stateful firewalls, traffic performance optimization (TPO). The communication networks also allow provision of applications such as VoIP, streaming video, streaming music, multi-user gaming, location based services, and a variety of content delivered to a mobile node. Residing within the gateway can be one or more network processing units, line cards, as well as packet and voice processing cards.

Network devices can share their real-time load information to enable distributed load management. A network device can track its own load information in real-time, therefore each network device can make local decisions in response to its real-time load. For example, each network device can autonomously diagnose whether the network device is in an overloaded state, and if so, it can notify the operator for further instructions. Conventionally, a network device is not aware of the real-time load information at other network devices, so each network device can only make informed decisions for itself. However, if each network device shares its load information with every other network devices, each network device can become aware of the network-wide load information and can make informed decision involving other network devices as well as itself.

A network device can share its real-time load information with other network devices by establishing inter-device communication channels. The real-time load information for a network device can include one or more of the following: (1) the number of mobile stations currently attached to the network device, (2) the number of additional mobile stations that can be attached to the network device, (3) the amount of data currently being handled by the network device, and (4) the amount of additional data that can be handled by the network device. A network device can also communicate control data and user data as well as load information over the communication channel. Using the inter-device communication channels, a network device can share one or more of the following: (1) the maximum amount of load that can be handled by the device, (2) a network device identifier, such as the network resource identifier (NRI) of the device, (3) data transfer capacity (i.e., the amount of data that can be handled, also known as data transfer bandwidth, or the number of mobile stations that can be handled) that can be set aside for other network devices, (4) session information, for instance context information, of mobile stations attached to the network device, and (5) buffered data for mobile stations attached to the device. Using the information shared on the inter-device communication channels, each network device can determine whether any data traffic can be handed over to other network devices, and if so, how much data traffic can be handed over to other network devices. A network device that hands over its data traffic to other network devices is called a source device; a network device that receives the data traffic is called a target device. Once the source device decides to hand over some of its data traffic to target devices, the source device can transmit session information as well as buffered data associated with the handed-over data traffic to the target devices using the inter-device communication channels. This enables a data traffic hand over with little or no data loss.

The inter-device communication channels can directly couple every pair of network devices, or they can couple network devices in a serial manner (e.g. a ring topology) where each network device is connected to two other network devices to form a ring. The disclosed systems and methods are not bound by a particular topology of the inter-device communication channels. The disclosed systems and methods are also not bound by a communication protocol used in the inter-device communication channels. Furthermore, the disclosed systems and methods are not bound by a particular communication medium; for instance, the inter-device communication channel can be established on a physical link, a wireless link, or a network.

The benefit of using inter-device communication channels is illustrated in detail using two example embodiments: network device overload prevention and network device offloading.

Network Device Overload Prevention

Figure 3:
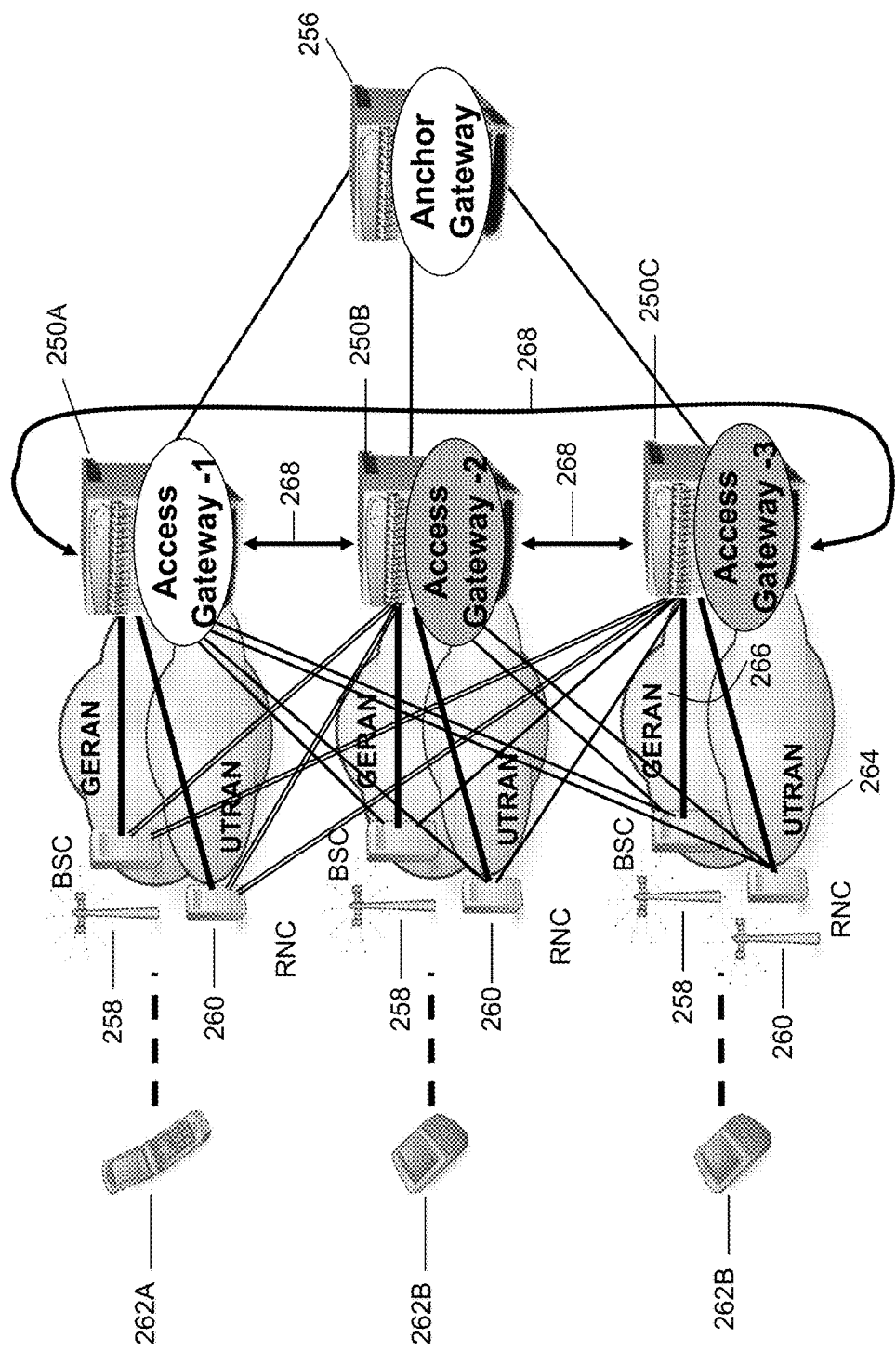
FIG. 3 is a block diagram of a communication system in accordance with certain embodiments.

In accordance with certain embodiments, the distributed dynamic load management scheme can prevent network device overloading. FIG. 3 illustrates an example embodiment of a pooled network. This example embodiment includes three access gateways 250A-250C, connected using inter-device communication channels 268. All access gateways are connected to an anchor gateway 256 to access external network. In this embodiment, a mobile station 262A-262C accessing the GPRS network is considered. Therefore, the access gateway 250A-250C is a Service GPRS Support Node (SGSN) and the anchor gateway 256 is a Gateway GPRS Support Node (GGSN). Each SGSN 250A-250C is also connected to every Radio Network Controller (RNC) 258 and/or Base Station Controller (BSC) 260 through a radio access network, such as UMTS Terrestrial Radio Access Network (UTRAN) 264 and GSM EDGE Radio Access Network (GERAN) 266. Each SGSN 250A-250C can request RNC 258/BSC 260 to re-route a mobile station 262A-262C to another SGSN 250A-250C by modifying a serving network device identifier in a mobile station identifier associated with the mobile station 262. A serving network device identifier can include a network resource identifier (NRI), and a mobile station identifier can include Temporary Mobile Subscriber Identity (TMSI) and Packet-Temporary Mobile Subscriber Identity (P-TMSI).

In this network embodiment, access gateway-1 250A (source SGSN) is reaching its load capacity. Without the overload prevention capability, the source SGSN 250A would simply turn down any new attach requests from mobile stations. However, using the distributed dynamic load management scheme, the network can reconfigure itself according to the real-time load so that more mobile stations can be accommodated. To do so, before the source SGSN 250A becomes overloaded, the source SGSN 250A can notify other SGSNs 250B/250C (target SGSNs) using the inter-device communication channels 268 that the source SGSN 250A may overload. In addition to notifying the overload condition, the source SGSN 250A can also query which target SGSNs 250B/250C can accommodate more load so that, in case the source SGSN 250A receives a new attach request from a mobile station 262A-262C, the source SGSN 250A can hand over the new attach request to target SGSNs 250B/250C. Essentially, the source SGSN 250A prepares its response to new attach requests based on the load information at target SGSNs 250B/250C. When the source SGSN 250A does receive new attach requests from mobile stations, the source SGSN 250A can hand over those attach requests to under-utilized target SGSNs 250B/250C. Therefore, the dynamic load management improves the network efficiency by fully utilizing available resources. It can lead to subscriber satisfaction and prevent revenue losses for operators by serving more data requests.

Figure 4:
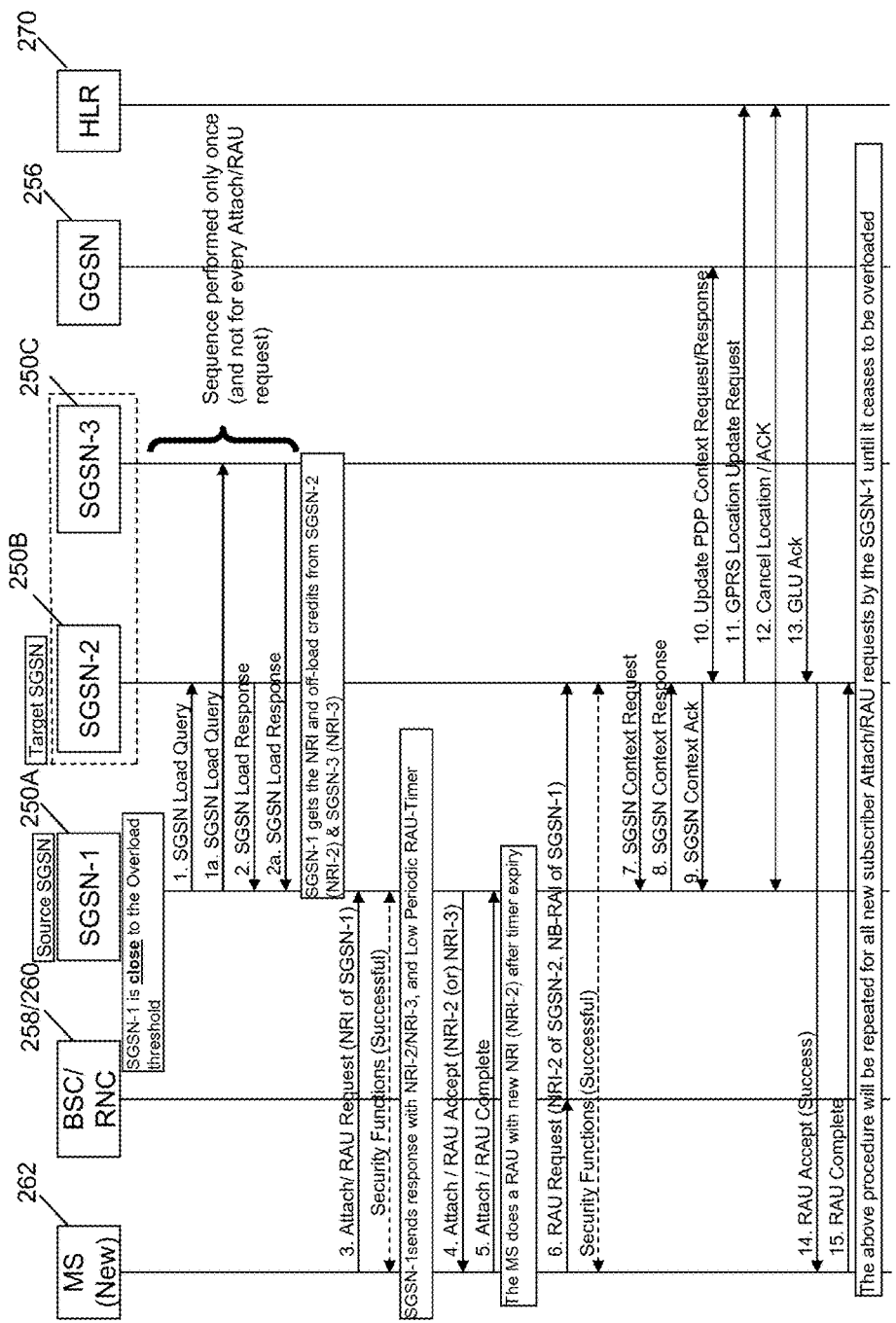
FIG. 4 is a call flow diagram of a distributed overload protection procedure in accordance with certain embodiments.

FIG. 4 shows a detailed flow diagram of the overloading prevention mechanism in accordance with certain embodiments. Before any of these steps are carried out, the inter-device communication channels 268 are established. As described above, the source SGSN 250A is close to reaching its load capacity. This condition can be detected manually by the network operator or automatically by the source SGSN 250A by inspecting its own data load. In step 1, the source SGSN 250A can send an inquiry message, which can include SGSN Load Query, to target SGSNs 250B/250C to broadcast that the source SGSN 250A is about to overflow and to query target SGSNs' real-time load information. In this step, the source SGSN 250A can also send a request message to request target SGSNs to set aside data transfer capacity for the source SGSN 250A. In step 2, target SGSNs 250B/250C can respond to the inquiry message and the request message. In their response, target SGSNs 250B/250C can indicate one or more of the following: (1) the amount of real-time data load, (2) how many new subscribers they can accommodate and for how long this information is valid, (3) whether they can reserve their data transfer capacity for the source SGSN 250A, and (4) their Network Resource Identifier (NRI), which can be used for re-routing new attach requests from the source SGSN 250A. In order to reduce the inter-device communication overhead, steps 1-2 can be performed only once when the amount of data load at the source SGSN 250A is reaching its maximum data transfer capacity.

In step 3, a new mobile station (MS) 262 sends an attach request to the source SGSN 250A and requests a Routing Area Update (RAU). The source SGSN 250A carries out the attach procedure and authenticates the MS 262. In step 4, upon authentication, the source SGSN 250A accepts the attach request and the RAU request, but with a Packet-Temporary Mobile Subscriber Identity (P-TMSI) carrying the NRI of the target SGSN 250B/250C, the Routing Area Identification (RAI) of the source SGSN 250A, and a timer value. The timer value can be a routing area update periodic timer value that indicates whether the update is stale. It can include a low periodic RAU timer value, typically 4 ms, but can be less than or greater than this value. In step 5, once the MS 262 receives the message that the RAU request has been accepted, it sends a RAU Complete flag to the source SGSN 250A to indicate that the connection is established.

In step 6, soon after sending the RAU Complete flag, the MS 262 sends another RAU request. This time, the request is sent to one of the target SGSNs 250B/250C, specified by the modified NRI stored in P-TMSI. The target SGSN 250B/250C performs a security check, and once the security check is successful, in step 7, the target SGSN 250B/250C sends a session information (i.e., context information) request to the source SGSN 250A. In step 8, the source SGSN 250A responds to the session information request with the MS's session information, and in step 9, the target SGSN 250B/250C acknowledges it. Subsequently, in step 10, the target SGSN 250B/250C requests GGSN 256 to update the Packet Data Protocol (PDP) contexts, and GGSN 256 acknowledges it. In step 11, the target SGSN 250B/

250C requests the Home Location Register (HLR) 270 to update the GPRS location. In steps 12-13, the HLR 270 communicates with the source SGSN 250A to cancel the stored location on the source SGSN 250A, and the HLR 270 sends a message to the target SGSN 250B/250C to acknowledge that the GPRS location has been updated. Once these operations are successfully carried out, the target SGSN 250B/250C and the MS 262 complete the routing area update.

The source SGSN 250A repeats steps 4-15 for every new attach request (step 3) until the source SGSN 250A is no longer close to overloading. When the source SGSN 250A can accommodate new attach requests from mobile stations, the source SGSN 250A can notify target SGSNs 250B/250C to release the data transfer capacity reserved for the source SGSN 250A.

Network Device Offloading

In some embodiments, a network device offloads a large amount of load to other network devices. This can be useful when network devices are taken off-line for maintenance purposes. Offloading mobile stations can be especially challenging when the selected network devices are actively serving those mobile stations, in which case offloading can lead to service disruptions. Even in this challenging scenario, however, the inter-device load communication enables offloading data traffic from the source network device to target network devices with little or no service disruption.

Figure 5:
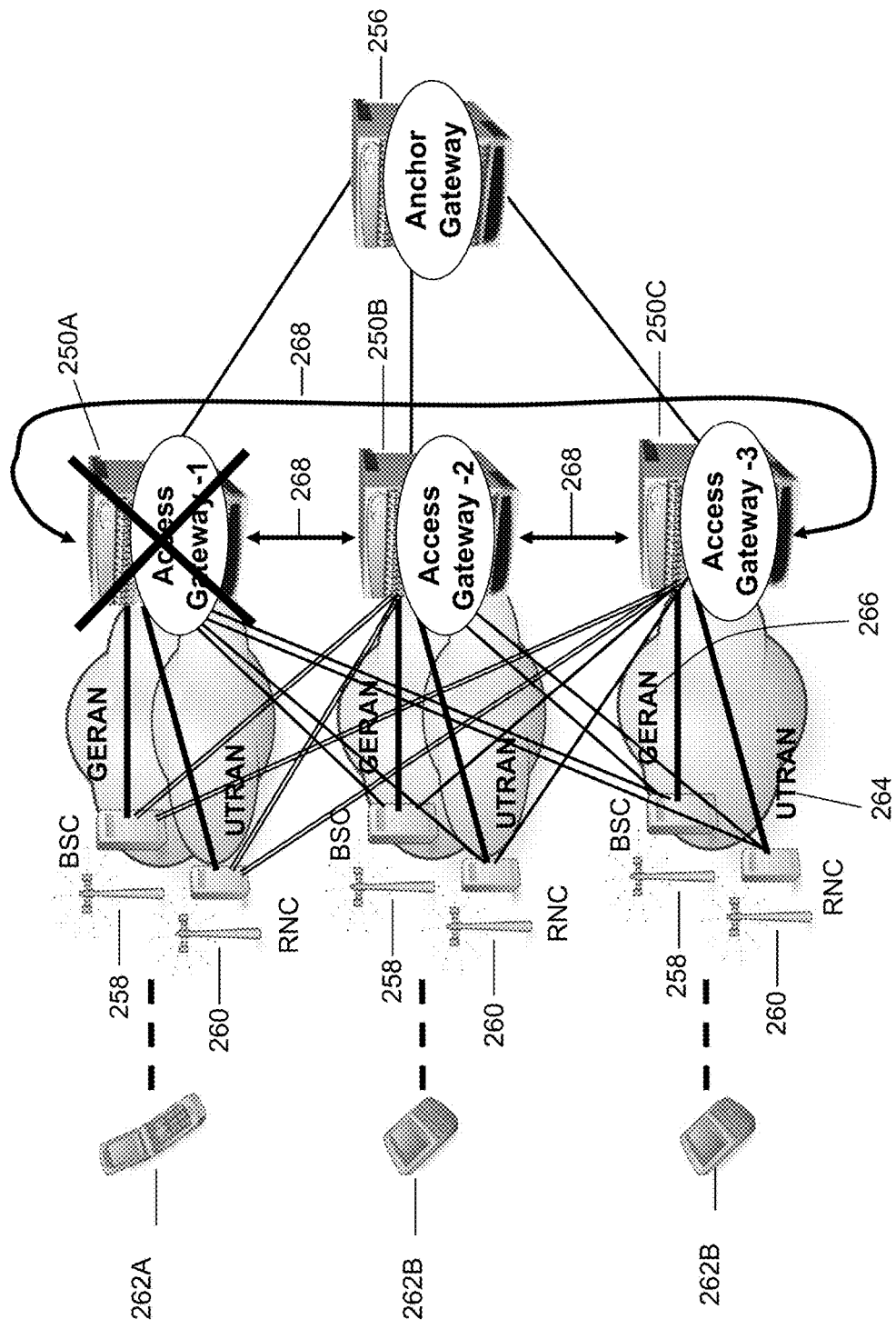
FIG. 5 is a block diagram illustrating offloading at a network device in accordance with certain embodiments.

In accordance with certain embodiments, the distributed dynamic load management scheme can help offload a large amount of data traffic from network devices. FIG. 5 illustrates an example embodiment in which the operator decides to stop the operation of the access gateway-1 250A (source device). In this embodiment, a mobile station accessing the GPRS network is illustrated. Therefore, the access gateway 250A-250C is a Service GPRS Support Node (SGSN) and the anchor gateway 256 is a Gateway GPRS Support Note (GGSN). Using the inter-device communication scheme, the source SGSN 250A can notify target SGSNs 250B/250C of impending offloading and query which target SGSNs 250B/250C can accommodate more data traffic. The source SGSN 250A can inspect target SGSNs' responses to determine how much of its data load can be handed over to each target SGSN 250B/250C. Given this information, the source SGSN 250A can hand over MS sessions to target SGSNs 250B/250C, and instruct an RNC/BSC 258/260 to re-route the selected MS 262 to each target SGSN 250B/250C. This offloading scheme can distribute the data load to fully utilize network resources without overloading other network devices. It can also be fully automatic, ensuring fast and efficient offloading operations. In addition, this scheme can be used in conjunction with standard offloading procedures, including Iu flex or Gb flex described in 3GPP TS 23. 236., without altering them, therefore this scheme can be transparent to other devices in the network, such as RNC 260 or BSC 258.

Figure 6:
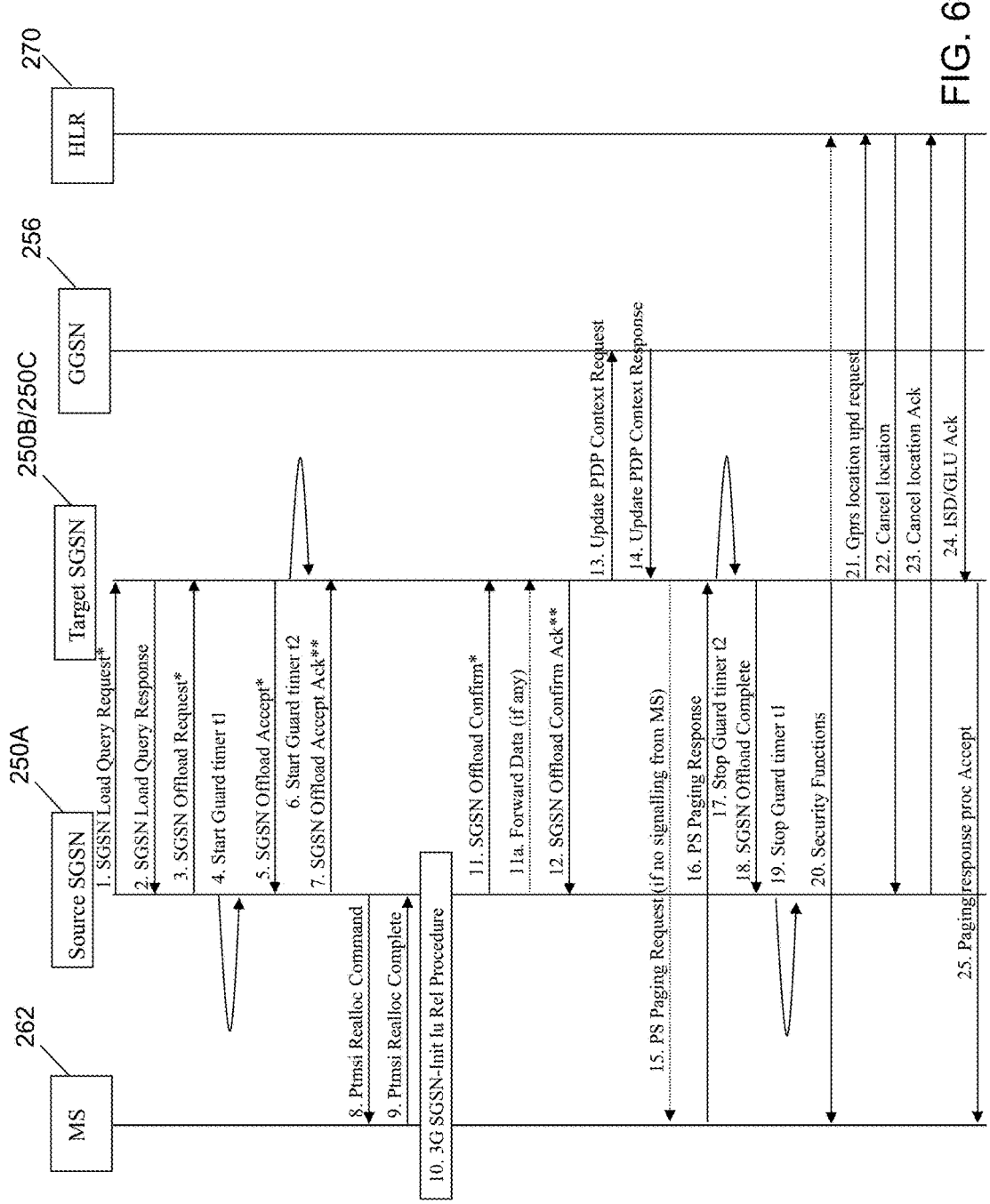
FIG. 6 is a call flow diagram of a distributed offloading procedure in accordance with certain embodiments.

FIG. 6 illustrates a detailed flow diagram of the distributed, dynamic load aware offloading in accordance with certain embodiments. As described above, the operator decides to offload the source SGSN 250A. The offload procedure starts with the source SGSN 250A communicating with target SGSNs 250B/250C over the inter-device communication channel. In steps 1-7, the source SGSN 250A determines the amount of load to hand over to each target SGSN 250B/250C. In this process, the source SGSN 250A can negotiate with each target SGSN 250B/250C the amount of load to be handed over from the source SGSN 250A. In step 1, the source SGSN 250A can send an inquiry message, which includes SGSN Load Query, to target SGSNs 250B/250C to query target SGSNs' real-time load information. In step 2, each target SGSN 250B/250C can respond to the source SGSN 250A's inquiry message indicating the target SGSN's real-time load information, which can include whether or not the target SGSN 250B/250C can accommodate more data load. If the target SGSN 250B/250C can accommodate more data load, it can reserve some of its data transfer capacity for the source SGSN 250A, and indicate in the response to the source SGSN 250A the amount of extra data load it can accommodate. Each target SGSN 250B/250C can autonomously make this decision based on its real-time load information.

In steps 3-4, once the source SGSN 250A receives responses from target SGSNs 250B/250C, the source SGSN 250A can determine the amount of load to hand over to each of the target SGSNs 250B/250C. Then the source SGSN 250A can send a request message, which can include a SGSN Offload Request, to available target SGSNs 250B/250C to request setting aside data transfer capacity for the source SGSN 250A. In this request message, source SGSN 250A can include International Mobile Subscriber Identity (IMSI), Mobility Management (MM) context, and Packet Data Protocol (PDP) contexts of one or more MSs 262 that will be handed over to the target SGSNs 250B/250C. After sending the request, the source SGSN 250A immediately starts a timer "t1" to guard against potential error in the offloading process. In steps 5-6, upon receiving the offload request from the source SGSN 250A, each target SGSN 250B/250C accepts the request by responding with a message. This message can include a set of P-TMSI and Tunnel Endpoint Identifier (TEID) that can be used to hand over mobile stations to the target SGSN 250B/250C. In the above steps, messages can include information for one or more MSs 262, depending on the GTP control messaging scheme. This optimization can reduce the amount of communicated data between SGSNs 250A-250C. After responding to the offload request, each target SGSN 250B/250C starts a guard timer "t2" immediately. In step 7, the source SGSN 250A can acknowledge the message from the target SGSN 250B/250C. In the acknowledgement message in step 7, the source SGSN 250A can confirm that it will only offload previously negotiated amount of load to each target SGSN 250B/250C.

At this point, the source SGSN 250A has sufficient information to offload mobile stations in a controlled manner. The source SGSN 250A now selects mobile stations that will be handed over to each target SGSN 250B/250C, and initiates offloading procedures. In step 8, the source SGSN 250A sends a P-TMSI reallocation command to the radio access network, which relays the information to the corresponding MS 262. The P-TMSI reallocation command contains the P-TMSI received from the target SGSNs 250B/250C. The P-TMSI in the P-TMSI reallocation command contains a serving network device identifier indicating that the MS should be re-routed to the target SGSNs 250B/250C. This step ensures that offloaded data traffic will not land back on the source SGSN 250A. If SGSNs 250A-250C are operating in a 2G network, a "force to standby" bit can be set. In step 9, the MSs can change their P-TMSI and send a flag to the source SGSN 250A to acknowledge the change of their P-TMSI. Step 10 is only applicable for SGSNs 250A-250C operating in a 3G network. In this step, the source SGSN 250A initiates Iu release procedures with a BSC/RNC 258/260. In step 11, the source SGSN 250A communicates with the target SGSNs 250B/250C to confirm the offloading, and in step 12 target SGSNs 250B/250C acknowledge the offload confirmation.

While these offloading procedures are carried out, the core network can continue to send data to the MSs 262. The data can include voice data, video data, and text data. If the source SGSN 250A receives data that should be delivered to the re-routed MSs 262, the source SGSN 250A can temporarily store the received data in a link buffer. In step 11, in addition to the offloading confirmation, the source SGSN 250A can send the buffered data to the corresponding target SGSNs 250B/250C using the inter-device communication channels so that the target SGSNs 250B/250C can relay the buffered data to the re-routed MSs 262. This data hand-over operation ensures that the data packets for the re-routed MSs 262 are not lost during the offloading procedures, even if the source SGSN 250A was actively serving the re-routed MSs 262. Therefore, the data hand-over operation prevents session disruptions and ensures session continuity.

In steps 13-14, each target SGSN 250B/250C communicates with the GGSN 256 to update the PDP contexts. This operation notifies the GGSN 256 that the target SGSN 250B/250C is now serving the MS 262. Upon receiving this request, the GGSN 256 can update the PDP contexts and the GGSN 256 may also transmit data for the MS 262 to the target SGSN 250B/250C, which would be placed in target SGSN's buffer. If the MS 262 has not yet initiated signaling its new SGSN (i.e., target SGSN) by sending, for instance, Initial UE or Logical Link Control (LLC) frame, the target SGSN 250B/250C may send a paging request to the MS 262 in step 15. By this point, the target SGSN 250B/250C is ready to handle any Initial UE message (e.g. Attach, RAU, Service request, Detach) from the new P-TMSI. If the target SGSN 250B/250C operates on a 2G network, it is ready to handle any LLC frame with new Temporary Logical Link Identifier (TLLI). In step 16, the target SGSN 250B/250C can accommodate a signal initiation or a paging response from newly assigned MSs 262.

In steps 17-20, upon receiving a signal initiation or a paging response from the MS 262, the target SGSN 250B/250C stops the guard timer "t2", and sends an offload-complete message to the source SGSN 250A to indicate that the offloading is complete. Upon receiving the offload-complete message, the source SGSN 250A can stop the guard timer "t1". If the offload-complete message is not received before the guard timer "t1" reaches a preselected threshold value, the source SGSN 250A can send an error message to the network operator, and optionally stop the offload procedures and roll-back any operations performed since the start of the guard timer "t1". If the source SGSN 250A has received a Cancel-Location request, it can also clean up the MM context and/or PDP contexts. The target SGSN 250B/250C can process the signal initiation or the paging response from the MS 262 and perform security functions, which may involve communicating with the HLR 270 and with the MS 262.

In steps 21-24, as part of the paging response processing procedure, the target SGSN 250B/250C can request the HLR 270 to update the GPRS location. In response to the target SGSN's request, the HLR 270 can request the source SGSN 250A to cancel the location. the source SGSN 250A can acknowledge the Cancel Location request to the HLR 270. If the guard timer "t2" is not running, the source SGSN 250A can clean up the MM context and/or the PDP contexts; otherwise the source SGSN 250A can wait until the timer "t2" expires. The HLR 270 then sends a GPRS location update acknowledgment to the target SGSN 250B/250C. In step 25, the target SGSN 250B/250C can send Paging_response_procedure_accept to the MS 262. This step may not be carried out if the service request was a paging response or a signal indication from the MS 262. Upon completing the offloading procedure, the target SGSN 250B/250C can send any buffered data to the MS 262. This ensures that the offloading procedure is transparent to MSs 262.

Once the offloading is complete, the network can operate in a normal mode with the reduced number of operating network devices. When the source SGSN 250A is back on service and is ready to take on MS connections, the source SGSN 250A can send a return message to target SGSNs 250B/250C to request returning all MS connections offloaded from the source SGSN 250A to the source SGSN 250A.

The offloading scheme in FIG. 6 can be modified to proactively balance load across SGSNs. One possible modification is to let every SGSN 250A-250C communicate its real-time load information to every other SGSNs 250A-250C at a constant time interval. Based on the amount of data load on other SGSNs 250A-250C, each SGSN 250A-250C can decide to offload a certain amount of data traffic to under-utilized network devices. For instance, if the amount of load on a source SGSN 250A is greater than the amount of load at a target SGSN 250B/250C by a pre-determined amount or a threshold, then the source SGSN 250A can initiate the offloading procedures in steps 3-25 of FIG. 6. In an example embodiment of proactive load balancing, every SGSN 250A-250C would communicate with every other SGSNs 250A-250C to notify its real-time load at a constant time interval. In other words, instead of steps 1-2 of FIG. 6, in which the source SGSN 250A has to query for the real-time load information, every SGSN 250A-250C can receive the real-time load information of every other SGSNs 250A-250C without querying. And once one of the SGSNs (i.e., source SGSN) determines that it is carrying a larger amount of load compared to another SGSN (i.e., target SGSN) by a pre-determined threshold, the source SGSN 250A can initiate the offload procedures (i.e. steps 3-25) to offload MS sessions to the target SGSN 250B/250C. This scheme can balance the load distribution across SGSNs in the network.

Figure 7:
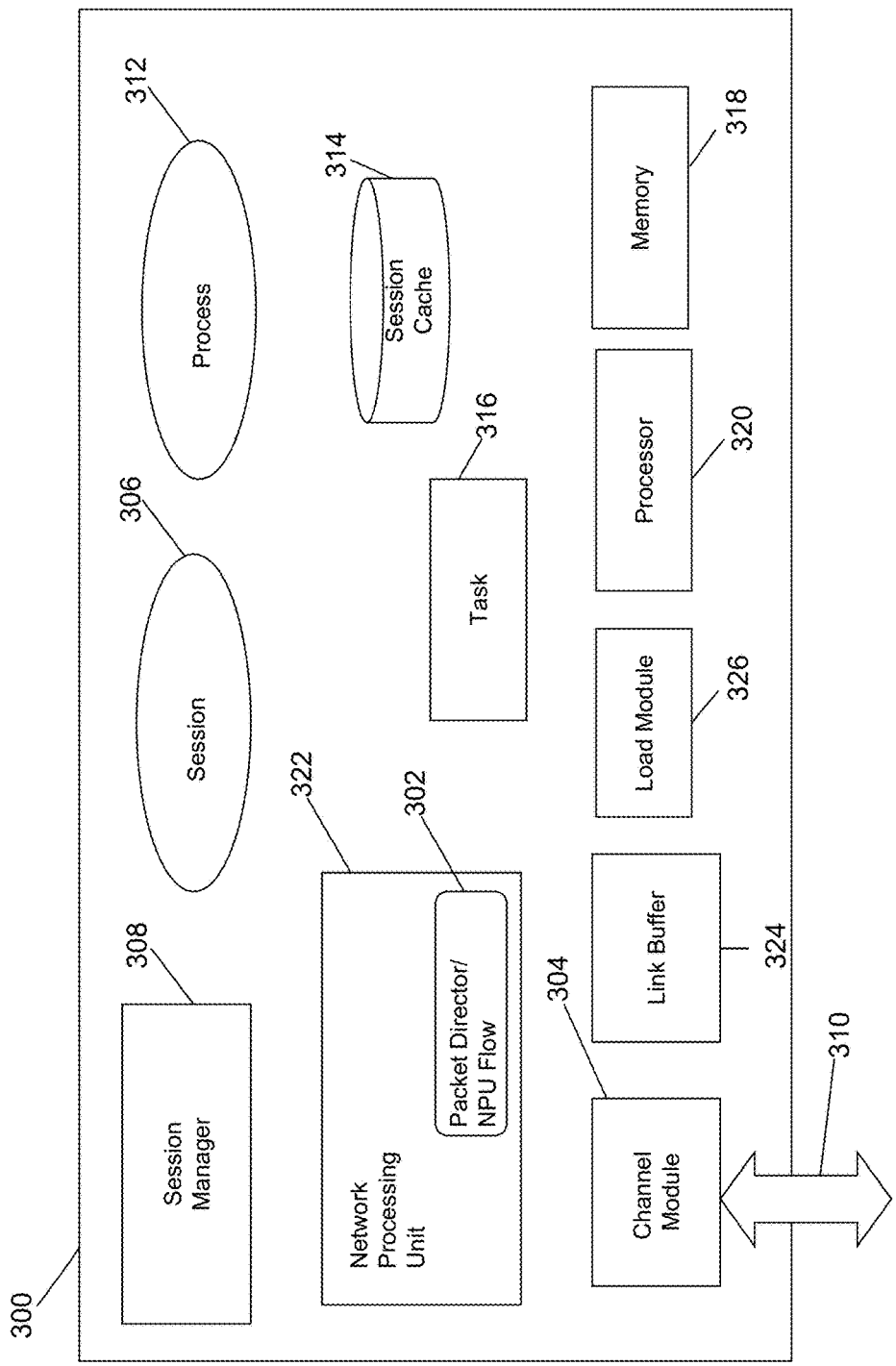
FIG. 7 illustrates the implementation of a network device in accordance with some embodiments.

FIG. 7 illustrates a logical view of a network device 300 in accordance with certain embodiments. The network device 300 includes a network processing unit (NPU) 322, a packet director/NPU flow 302, a channel module 304, a session 306, a session manager 308, interfaces 310, a process 312, a session cache/database 314, a task 316, a memory 318, a processor 320, a link buffer 324, and a load module 326.

Interfaces 310 can provide an input and/or output mechanism to communicate with other network devices. Interfaces can allow communication with mobile stations, domain name servers, as well as other gateways to send and receive data in the network. In particular, an offload interface, which is one of the Interfaces 310, can provide inter-device communication channels. Interfaces can be implemented in hardware to send and receive signals in a variety of mediums, such as optical, copper, and wireless and in a number of different protocols some of which may be non-transient.

A channel module 304 can establish inter-device communication channels with other network devices. The channel module 304 can also manage data communication over the inter-device communication channels in accordance with a communication medium or a protocol. A load module 326 can measure the real-time load at the network device 300. The load module 326 can monitor one or more of the interfaces 310, the processor 320, and the channel module 304 to measure the amount of load carried by the network device 300. When the network device 300 has sufficient information for offloading, it selects mobile stations to be handed over to each target network device using a selection module. A processor 320 can hand over the selected mobile stations by modifying a serving network device identifier in a mobile station identifier. The modules can be implemented in software using memory 318 such as a computer readable medium, a programmable read only memory (PROM), or flash memory. The software can run on a processor 320 that executes instructions or computer code. The modules may also be implemented in hardware using an application specific integrated circuit (ASIC), programmable logic array (PLA), or any other integrated circuit.

A link buffer 324 can temporarily store data received for the mobile stations that have been rerouted to other network devices. The data in the link buffer can be transmitted to target network devices that carry the re-routed mobile stations using the inter-device communication channels. The transmission of the data stored in the link buffer 324 can be scheduled by the channel manager 304. A link buffer can be implemented using memory 318 such as a computer readable medium, a programmable read only memory (PROM), or flash memory.

A session manager 308 can provide management of a session 306 on the network device. A session 306 can include one or more connections for a subscriber in the service provider's network. A session 306 can include information relating to the mobile device or mobile station as well as to each data connection established with the mobile station over the network. The session can include policy information, billing information, services to be provided, quality of service (QoS) information, and any other applicable information. Each session 306 can share the processor 320 and memory 318 resources on the network device. The session manager 308 can work with other modules and components in the network device to ensure the session is handled appropriately. The session manager 308 can assign resources, perform tasks, and log information regarding the session.

Mobile Station and Gateway

The mobile station described above can communicate with a plurality of radio access networks using a plurality of access technologies and with wired communication networks. The mobile station can be a smart phone offering advanced capabilities such as word processing, web browsing, gaming, e-book capabilities, an operating system, and a full keyboard. The mobile station may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The mobile station may have the capability to run applications or communicate with applications that are provided by servers in the communication network. The mobile station can receive updates and other information from these applications on the network.

The mobile station also encompasses many other devices such as televisions (TVs), video projectors, set-top boxes or set-top units, digital video recorders (DVR), computers, netbooks, laptops, and any other audio/visual equipment that can communicate with a network. The mobile station can also keep global positioning coordinates, profile information, or other location information in its stack or memory. The mobile station can have a memory such as a computer readable medium, flash memory, a magnetic disk drive, an optical drive, a programmable read-only memory (PROM), and/or a read-only memory (ROM). The mobile station can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The mobile station can also provide a variety of user interfaces such as a keyboard, a touch screen, a trackball, a touch pad, and/or a mouse. The mobile station may also include speakers and a display device in some embodiments.

The distributed dynamic load management described above is implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA). The distributed dynamic load management can be implemented on network devices of the same type, implementing the same set of functionalities.

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. The offload gateway can be implemented as any combination of the following including an xGSN, an xGW, an xGW-SGW, and an xGW-PGW.

Figure 8:
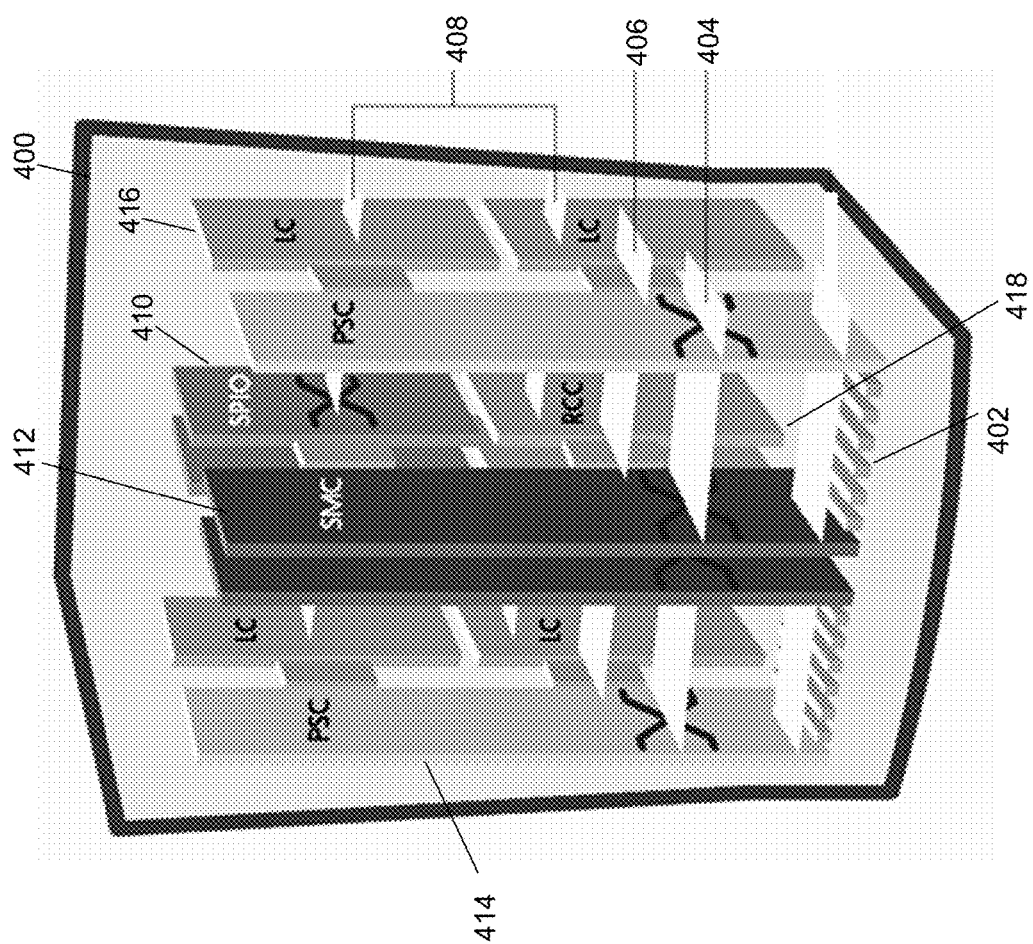
FIG. 8 illustrates a network device in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 8 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 9:
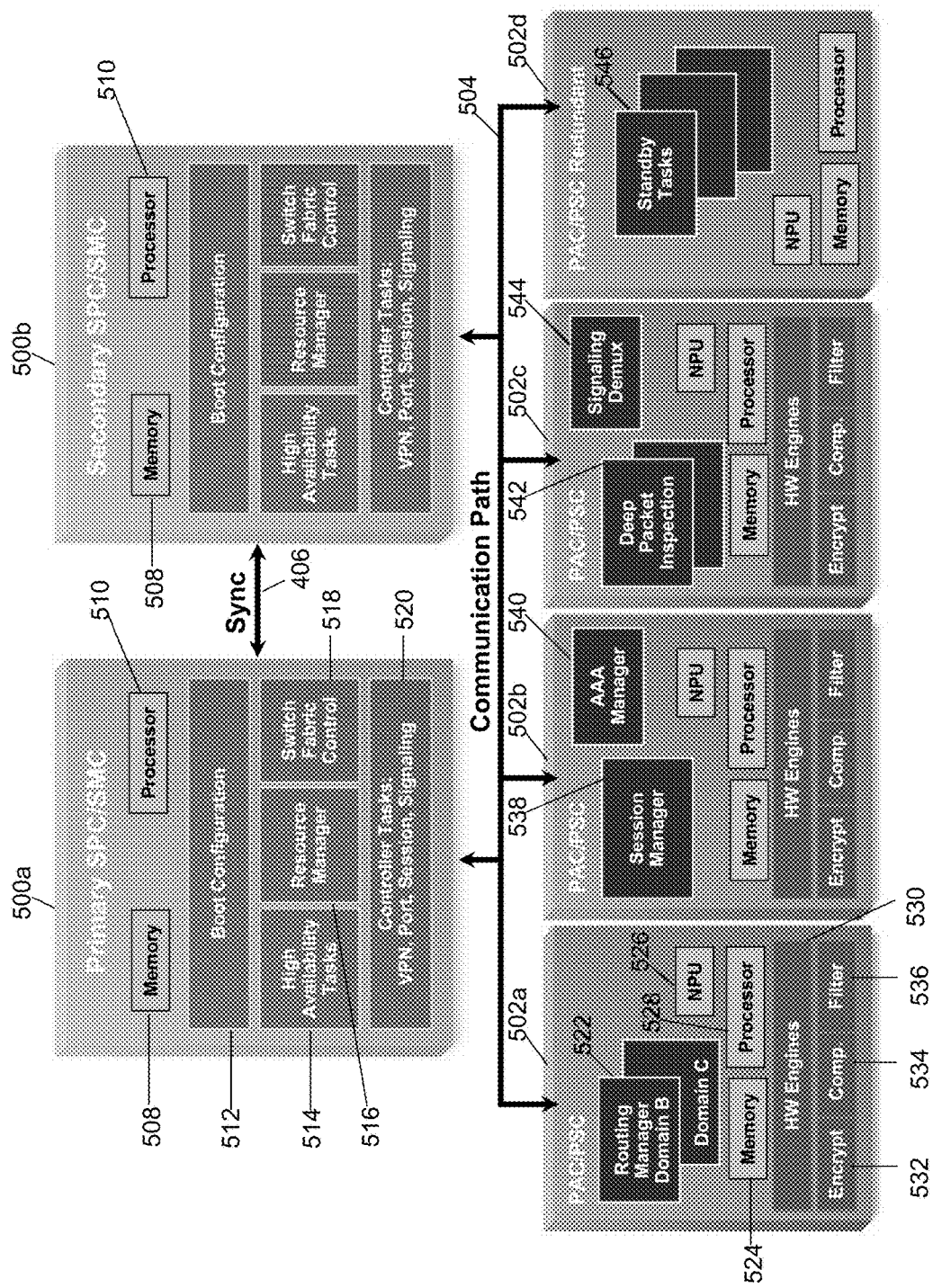
FIG. 9 illustrates a logical view of the software architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 9 illustrates a logical view of the software architecture of a network device in accordance with certain embodiments. As shown, the software and hardware can be distributed within the network device and across different circuit boards, processors, and memory. FIG. 9 includes a primary switch processor card (SPC)/system management card (SMC) 500a, a secondary SPC/SMC 500b, PAC/PSC 502a-502d, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manage and control the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for user equipment.

The PAC/PSC 502 are high-speed processing cards that are designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 are also capable of running a variety of tasks or modules. PAC/PSC 502a provides routing managers 522 with each covering routing of a different domain. PAC/PSC 502b provides a session manager 538 and an AAA manager 540. The session manager 538 manages one or more sessions that correspond to one or more user equipment. A session allows a mobile station to communicate with the network for voice calls and data. The AAA manager 540 manages accounting, authentication, and authorization with an AAA server in the network. PAC/PSC 502 provides a deep packet inspection task 542 and a signaling demux 544. The deep packet inspection task 542 provides inspection of packet information beyond layer 4 for use and analysis by the network device. The signaling demux 544 can provide scalability of services in combination with other modules. PAC/PSC 502d provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, a network of GGSNs can be configured to share real-time load information to dynamically adjust load on each GGSN.

We claim:

1. A first network device comprising:
a processor, in communication with one or more interfaces that are to provide communication with a plurality of other network devices and a plurality of mobile stations, the processor to:
receive load information from the plurality of other network devices;
determine, based on at least a portion of the load information, that a network device of the plurality of other network devices is capable of setting aside data transfer capacity for the first network device; and
cause a mobile station to be routed to the network device of the plurality of other network devices by modifying a serving network device identifier in a mobile station identifier associated with the mobile station to cause data to be communicated between the mobile station and the network device of the plurality of other network devices.

2. The first network device of claim 1, wherein the serving network device identifier comprises a Network Resource Identifier (NRI).

3. The first network device of claim 1, wherein the mobile station identifier comprises a Temporary Mobile Subscriber Identity (TMSI).

4. The first network device of claim 1, wherein the mobile station identifier comprises a Packet-Temporary Mobile Subscriber Identity (P-TMSI).

5. The first network device of claim 1, wherein the network device is a Mobility Management Entity (MME).

6. The first network device of claim 1, wherein the network device is a Serving GPRS Support Node (SGSN).

7. The first network device of claim 1, the processor further to:
receive a routing area update (RAU) request from the mobile station; and
send a response to the RAU request to the mobile station, the response comprising the modified serving network device identifier, the modified serving network device identifier comprising a network device identifier of the network device of the plurality of other network devices.

8. The first network device of claim 7, wherein the response to the RAU request comprises a low periodic RAU timer value designed to cause the mobile station to send a RAU request to the network device of the plurality of other network devices after a time period corresponding to the low periodic RAU timer value.

9. The first network device of claim 1, wherein the other network devices are each of the same type of network device as the first network device.

10. The first network device of claim 1, the processor further to receive a message from the network device of the plurality of other network devices, the message comprising load information of the network device and a network device identifier of the network device.

11. A method comprising:
receiving, at a first network device, load information of a second network device;
determining, by the first network device based on the load information of the second network device, that the second network device is capable of setting aside data transfer capacity for the first network device; and
causing a mobile station to be routed to the second network device by modifying, by the first network device, a serving network device identifier in a mobile station identifier associated with the mobile station to cause data to be communicated between the mobile station and the second network device.

12. The method of claim 11, wherein the first network device and the second network device are the same type of device.

13. The method of claim 12, wherein the type of device of the first network device and the second network device is a Mobility Management Entity (MME).

14. The method of claim 12, wherein the type of device of the first network device and the second network device is a Serving GPRS Support Node (SGSN).

15. The method of claim 11, further comprising:
receiving, at the first network device, a routing area update (RAU) request from the mobile station; and
sending, by the first network device, a response to the RAU request to the mobile station, the response comprising the modified serving network device identifier, the modified serving network device identifier comprising a network device identifier of the second network device.

16. At least one non-transitory computer readable medium comprising logic that when executed is operable to:
receive, at a first network device, load information of a second network device;
determine, by the first network device based on the load information of the second network device, that the second network device is capable of setting aside data transfer capacity for the first network device; and
cause a mobile station to be routed to the second network device by modifying, by the first network device, a serving network device identifier in a mobile station identifier associated with the mobile station to cause data to be communicated between the mobile station and the second network device.

17. The at least one medium of claim 16, wherein the first network device and the second network device are the same type of device.

18. The at least one medium of claim 17, wherein the type of device of the first network device and the second network device is a Mobility Management Entity (MME).

19. The at least one medium of claim 17, wherein the type of device of the first network device and the second network device is a Serving GPRS Support Node (SGSN).

20. The at least one medium of claim 16, the logic when executed further to:
receive, at the first network device, a routing area update (RAU) request from the mobile station; and send, by the first network device, a response to the RAU request to the mobile station, the response comprising the modified serving network device identifier, the modified serving network device identifier comprising a network device identifier of the second network device.

* * * * *